United States Patent
Caceres (10) Patent No.: US 10,830,196 B2
(45) Date of Patent: Nov. 10, 2020

(54) FILTER FOR FUEL INJECTORS

(71) Applicant: Caterpillar Inc., Deerfield, IL (US)

(72) Inventor: Diego Caceres, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 168 days.

(21) Appl. No.: 16/203,820

(22) Filed: Nov. 29, 2018

(65) Prior Publication Data

US 2020/0173410 A1 Jun. 4, 2020

(51) Int. Cl.
| | |
|---|---|
| *F02M 61/16* | (2006.01) |
| *B01D 29/00* | (2006.01) |
| *B01D 29/31* | (2006.01) |
| *F02M 37/32* | (2019.01) |
| *F02M 47/02* | (2006.01) |

(52) U.S. Cl.
CPC ....... *F02M 61/165* (2013.01); *B01D 29/0043* (2013.01); *B01D 29/31* (2013.01); *F02M 61/168* (2013.01); *F02M 2200/04* (2013.01); *F02M 2200/8076* (2013.01)

(58) Field of Classification Search
CPC .... F02M 61/165; F02M 61/168; F02M 37/32; F02M 2200/885; F02M 2200/803; F02M 2200/852; F02M 2200/27; F02M 2200/703; F02M 2200/04; F02M 2200/8076; F02M 47/025; B01D 29/0043; B01D 29/31

See application file for complete search history.

(56) References Cited

U.S. PATENT DOCUMENTS

| | | | |
|---|---|---|---|
| 4,608,166 A | 8/1986 | Cain | |
| 7,673,817 B2 | 3/2010 | Brauneis et al. | |
| 8,460,422 B2 | 6/2013 | McClure | |
| 2004/0069704 A1 | 4/2004 | Yamaguchi et al. | |
| 2005/0178861 A1 | 8/2005 | Sugiyama | |
| 2009/0120869 A1 | 5/2009 | Harkema et al. | |
| 2009/0236448 A1* | 9/2009 | Burkhard | F02M 61/165 239/575 |
| 2015/0136088 A1* | 5/2015 | Cavanagh | F02M 61/165 123/470 |

(Continued)

FOREIGN PATENT DOCUMENTS

| | | |
|---|---|---|
| DE | 102014226003 A1 | 6/2016 |
| GB | 2324571 A | 10/1998 |
| JP | 6221998 | 11/2017 |

OTHER PUBLICATIONS

WIPO Office, International Search Report for PCT/US2019/061369. Authorized Officer Deborah Grandis, Not yet published, Publisher will be WIPO Office, Entire Document.

*Primary Examiner* — Liam Royce (57) ABSTRACT

A filter for filtering hydraulic fluid in a hydraulically actuated fuel injector. The filter includes a first disc structure and a second disc structure disposed axially spaced apart from the first disc structure. The second disc structure is also disposed parallel to the first disc structure. The filter further includes an intermediate structure extending from the first disc structure to the second disc structure. The intermediate structure includes a first surface and a second surface disposed opposite and parallel to the first surface. The intermediate structure defines a plurality of passages extending from the first surface to the second surface. Each of the plurality of passages is perpendicular to a longitudinal axis of the filter.

20 Claims, 8 Drawing Sheets

(56) References Cited

U.S. PATENT DOCUMENTS

2017/0009718 A1 1/2017 Caceres
2017/0306913 A1 10/2017 Krejci
2018/0291853 A1 10/2018 Nair et al.

* cited by examiner

FILTER FOR FUEL INJECTORS

TECHNICAL FIELD

The present disclosure relates to fuel injectors, such as Hydraulically actuated Electronically controlled Unit Injectors (HEUIs), for use in injecting fuel in internal combustion engines. More particularly, the present disclosure relates to a filter for filtering hydraulic fluid in such injectors.

BACKGROUND

Internal combustion engines generally include hydraulically actuated Electronically controlled Unit Injectors (HEUI) for injecting fuel into a combustion chamber. In HEUIs, hydraulic fluid is utilized to pressurize the fuel to lift a needle valve for injecting fuel inside the combustion chamber. A presence of contaminants, debris, and/or impurities in the hydraulic fluid may erode interior surfaces or various components of the HEUI, and may adversely affect the HEUIs and potentially reduce the HEUI life.

US Patent No. 20050178861 relates to a fuel injector for supplying fuel into an internal combustion engine. The fuel injector includes a fuel filter disposed at a fuel inlet opening. The fuel filter includes a frame made of resin and a substantially flat filter element supported in the frame.

SUMMARY

In one aspect, the disclosure is directed towards a filter for filtering hydraulic fluid in a hydraulically actuated fuel injector. The filter includes a first disc structure and a second disc structure disposed axially spaced apart from the first disc structure. The second disc structure is also disposed parallel to the first disc structure. The filter further includes an intermediate structure extending from the first disc structure to the second disc structure. The intermediate structure includes a first surface and a second surface disposed opposite and parallel to the first surface. The intermediate structure defines a plurality of passages extending from the first surface to the second surface. Each of the plurality of passages is perpendicular to a longitudinal axis of the filter.

Certain aspects of the present disclosure relate to a hydraulically actuated fuel injector. The hydraulically actuated fuel injector includes a body with a channel to receive hydraulic fluid and a filter for filtering the hydraulic fluid flowing through the channel. The filter includes a first disc structure engaged with the body and a second disc structure disposed axially spaced apart from the first disc structure and engaged with the body. The second disc structure is disposed parallel to the first disc structure. The filter also includes an intermediate structure extending from the first disc structure to the second disc structure. The intermediate structure is disposed, at least partly, within the channel. The intermediate structure includes a first surface and a second surface disposed opposite and parallel to the first surface. The intermediate structure defines a plurality of passages extending from the first surface to the second surface. Each of the plurality of passages is perpendicular to a longitudinal axis of the filter.

DETAILED DESCRIPTION

Figure 1:
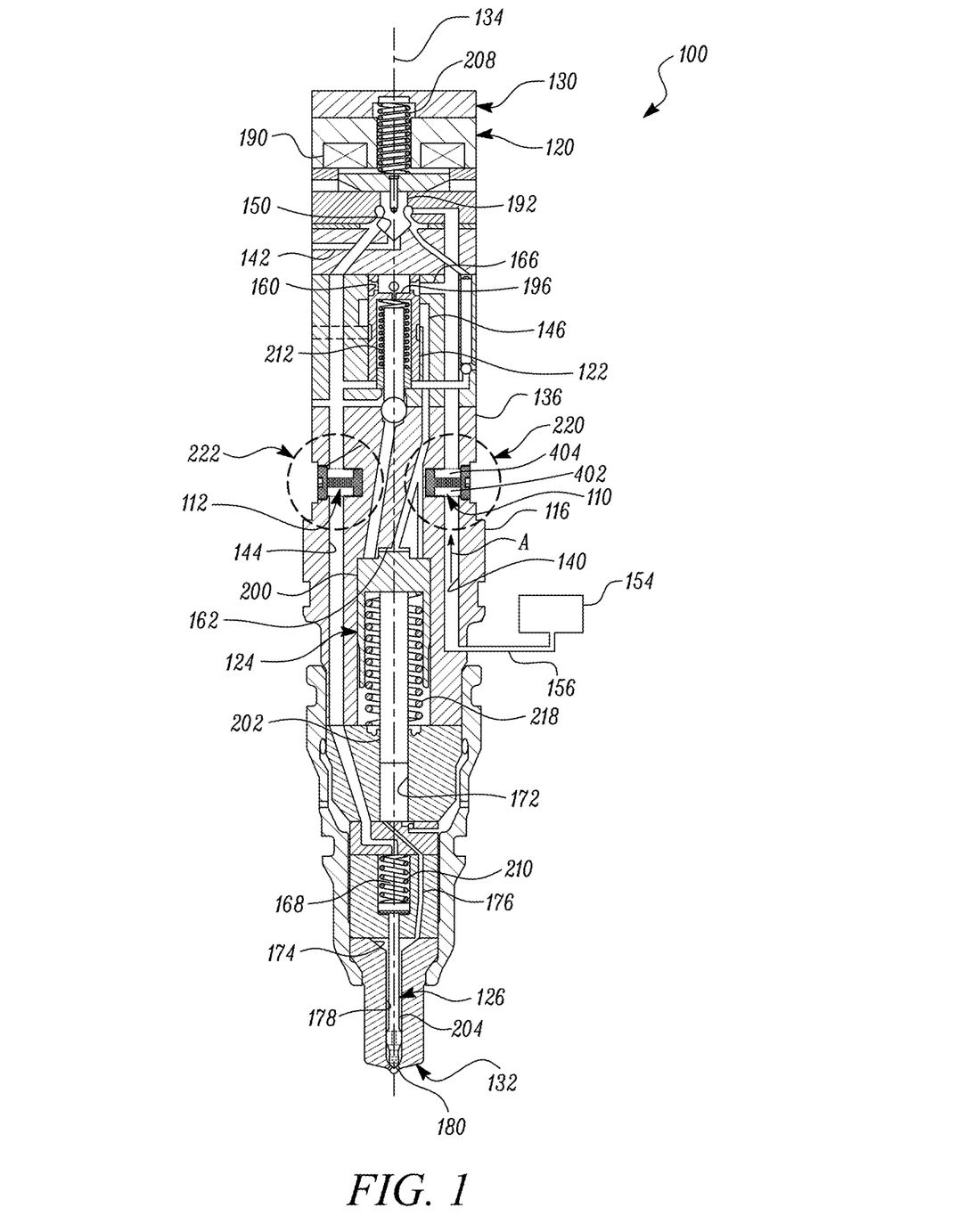
FIG. 1 is an exemplary hydraulically actuated fuel injector including a filter, in accordance with an embodiment of the present disclosure.

Referring to FIG. 1, a hydraulically actuated fuel injector 100 (hereinafter referred as fuel injector 100) is illustrated. In an example, the fuel injector 100 may correspond to and/or may include a Hydraulically actuated Electronically controlled Unit Injector (HEUI). The fuel injector 100 may be used to inject fuel such as gasoline, diesel, etc., into one or more combustion chambers of an internal combustion engine (not shown), during a combustion process. The fuel injector 100 may utilize a hydraulic fluid to actuate the fuel injector 100 for injecting fuel into the combustion chambers. According to an example, the hydraulic fluid utilized for actuation of the fuel injector 100 may include an engine lubricating oil, although other fluids may be applicable. Further, the fuel injector 100 includes a first filter 110 and a second filter 112, with both the first filter 110 and the second filter 112 being configured to filter the hydraulic fluid flowing in the fuel injector 100.

The fuel injector 100 may include an injector body 116 (hereinafter referred to as a body 116), a control valve assembly 120, a spool valve member 122, a piston assembly 124, and a needle valve system 126. Each of the control valve assembly 120, spool valve member 122, piston assembly 124, and needle valve system 126, work in concert to inject fuel into the combustion chamber. Exemplary discussions related to each of the body 116, the control valve assembly 120, the spool valve member 122, the piston assembly 124, and the needle valve system 126, will be set out below.

The body 116 includes a first end 130, a second end 132 opposite to the first end 130, a longitudinal axis 134 extending through the first end 130 and the second end 132, and an outer surface 136. According to an orientation of the body 116, as exemplarily depicted in FIG. 1, the first end 130 is disposed at the top, while the second end 132 is disposed at the bottom.

The body 116 may define multiple fluid passages for facilitating hydraulic fluid flow from one portion of the body 116 to another. For example, the body 116 includes a channel 140 (hereinafter referred to as a high-pressure passage 140), a low-pressure passage 142, a pressure control passage 144, and an actuation fluid passage 146. The high-pressure passage 140 and the pressure control passage 144 may both extend generally longitudinally along the longitudinal axis 134, and may be fluidly coupled to each other via a cavity section 150 disposed relatively closer to the first end 130 than to the second end 132, as shown. The high-pressure passage 140 may be fluidly coupled to a fluid source 154, and may accordingly receive hydraulic fluid from the fluid source 154 (see direction, A) for an actuation of the fuel injector 100. In some embodiments, the fluid source 154 includes a pressure pump (not shown) that is adapted to pressurize the hydraulic fluid for transit into the high-pressure passage 140.

Further, the body 116 defines an enclosure 160 disposed axially below the cavity section 150, and a chamber 162 disposed axially further below the enclosure 160 (according to the orientation of the fuel injector 100 depicted in FIG. 1). The high-pressure passage 140 is coupled to the enclosure 160 via a branch passage 166, while the enclosure 160 is fluidly coupled to the chamber 162 via the actuation fluid passage 146. Furthermore, the body 116 also includes a fuel pressurization chamber 172 disposed further axially below the chamber 162, and into which fuel may be transferred and pressurized for facilitating fuel injection. Additionally, the body 116 includes a nozzle chamber 174 fluidly coupled to the fuel pressurization chamber 172 via a nozzle supply passage 176. The nozzle chamber 174 includes an injection slot 178 that extends all the way to a nozzle outlet 180 of the body 116 disposed at the second end 132, as shown. The body 116 also includes a compartment 168 that is disposed below the fuel pressurization chamber 172, and which may be fluidly coupled to the pressure control passage 144.

For the purposes of the present disclosure, terms such as "upward", "upwards", "downward", and "downwards", as used, are relative to the orientation of the body 116 in FIG. 1. The terms "upward" or "upwards" mean towards (e.g., in a direction towards) the first end 130 of the body 116, while the terms "downward" or "downwards" mean towards (e.g., in a direction towards) the second end 132 of the body 116.

The control valve assembly 120 may be positioned at the first end 130 of the body 116, and may include an electrical actuator 190 and a pilot valve member 192. The electrical actuator 190 may include a solenoid that may be energized or de-energized by a controller or an electronic control module (ECM) (not shown) to operate the pilot valve member 192. An operation of the pilot valve member 192 includes a movement of the pilot valve member 192 to an upward position and a downward position relative to the cavity section 150. In the upward position of the pilot valve member 192, the pilot valve member 192 may block the high-pressure passage 140 from the low-pressure passage 142 and the pressure control passage 144, while allowing fluid communication between the low-pressure passage 142 and the pressure control passage 144. In the downward position of the pilot valve member 192 (i.e., the configuration shown in FIG. 1), the pilot valve member 192 may allow fluid communication to occur between the high-pressure passage 140 and the pressure control passage 144, while blocking the low-pressure passage 142 from each of the high-pressure passage 140 and the pressure control passage 144. As an example, when the electrical actuator 190 is energized, the pilot valve member 192 is moved to the upward position, and when the electrical actuator 190 is de-energized, the pilot valve member 192 is moved to the downward position. It may be noted that when the electrical actuator 190 is de-energized, the pilot valve member 192 may be biased to the downward position by action of a biasing spring 208.

The spool valve member 122 may be positioned within the enclosure 160, and may be movable upwards and downwards within (or relative to) the enclosure 160. As an example, the spool valve member 122 may be biased to an upward position by the action of a biasing spring 212. Further, the spool valve member 122 may include a head end surface 196 that may receive pressurized hydraulic fluid from the branch passage 166. During operation, pressure may be exerted on the head end surface 196 to push against the action of the biasing spring 212, and facilitate a downward movement of the spool valve member 122 within (or relative to) the enclosure 160. In an embodiment, the downward movement is executed along the longitudinal axis 134 within the enclosure 160.

The piston assembly 124 may include a piston 200, and a plunger 202 coupled (e.g., fixedly coupled) to the piston 200. The piston 200 may be disposed in the chamber 162, while the plunger 202 may extend partly into the fuel pressurization chamber 172, as shown. As with the spool valve member 122, the piston 200 may be configured to execute a back and forth stroke along the longitudinal axis 134 (i.e., upward and downward movement) within (or relative to) the chamber 162, as well. The piston 200 may be biased to an upward position by the action of a biasing spring 218. Since the actuation fluid passage 146 may be fluidly coupled between the enclosure 160 and the chamber 162, the back and forth stroke of the piston 200 may be enabled by controlling a pressure of the hydraulic fluid within the actuation fluid passage 146. As an example, as the piston 200 may execute a back and forth stroke, the plunger 202 may execute a concomitant back and forth stroke within (or relative to) the fuel pressurization chamber 172, as well (since the plunger 202 may be fixedly coupled to the piston 200). Accordingly, a pressure within the fuel pressurization chamber 172 may be controlled by a movement of the piston 200 and the plunger 202.

The needle valve system 126 may include a needle valve member 204 that extends in part into each of the injection slot 178, the nozzle chamber 174, and the compartment 168, as shown. The needle valve member 204 may be biased downwards towards the nozzle outlet 180 to close the nozzle outlet 180 (arranged at the second end 132 of the body 116) by use of a biasing spring 210. As the nozzle chamber 174 is fluidly coupled to the fuel pressurization chamber 172 through the nozzle supply passage 176, the needle valve member 204 may be actuated based on hydraulic fluid pressure acting through the nozzle supply passage 176 (discussed below), and accordingly, may be moved (e.g., reciprocated) to open and close the nozzle outlet 180, facilitating an injection of fuel through the nozzle outlet 180, during a combustion process.

Prior to a fuel injection event into the one or more combustion chambers of an associated internal combustion engine, as the electrical actuator 190 is de-energized, the pilot valve member 192 is held in its downward position (see position in FIG. 1) by a biasing spring 212. For an injection of fuel to occur, the electrical actuator 190 may be energized and the pilot valve member 192 may be moved to the upward position. In the upward position, the high-pressure passage 140 may be blocked away from the pressure control passage 144 and the low-pressure passage 142, as noted above, and thus high-pressure hydraulic fluid may be directed through the branch passage 166 towards the spool valve member 122, pushing the spool valve member 122 downwards against the action of the biasing spring 212. The downward movement of the spool valve member 122 causes high-pressure hydraulic fluid in the actuation fluid passage 146 to act against the piston 200, forcing the piston 200 to move downwards against the action of the biasing spring 218. This downward movement results in a corresponding downward movement of the plunger 202, in turn raising a pressure of fuel housed within each of the fuel pressurization chamber 172, the nozzle supply passage 176, and the nozzle chamber 174.

Since in the upward position of the pilot valve member 192, the pressure control passage 144 may be blocked away from the high-pressure passage 140, and, instead, be fluidly coupled to the low-pressure passage 142, low pressure may act on the needle valve member 204 from above (i.e., through the pressure control passage 144 and the compartment 168). Therefore, as and when fuel pressure exerted on the needle valve member 204 from below (i.e., through the nozzle supply passage 176 and the nozzle chamber 174) exceeds a hydraulic fluid pressure from above (i.e., through the pressure control passage 144 and the compartment 168), the needle valve member 204 is lifted against the action of the biasing spring 210 and fuel is allowed to be sprayed from the nozzle chamber 174 into a combustion chamber through the nozzle outlet 180.

It may be noted that the body 116 of the fuel injector 100 may include a variety of other passages, structures, configurations, and specifications, based on an environment in which the fuel injector 100 is applied. The fuel injector 100, in general, may also work on a principle other than what has been discussed above, and it would accordingly be understood that the aforementioned details and working of the fuel injector 100 has been disclosed solely with the intention to attest one possible configuration and working of the fuel injector 100. It will be appreciated that various other fuel injector types, which use hydraulic fluid for actuation, and which have varying configurations and designs may make use of one or more aspects of the present disclosure. Accordingly, the structure and working of the fuel injector 100 need to be viewed as being purely exemplary.

Figure 2:
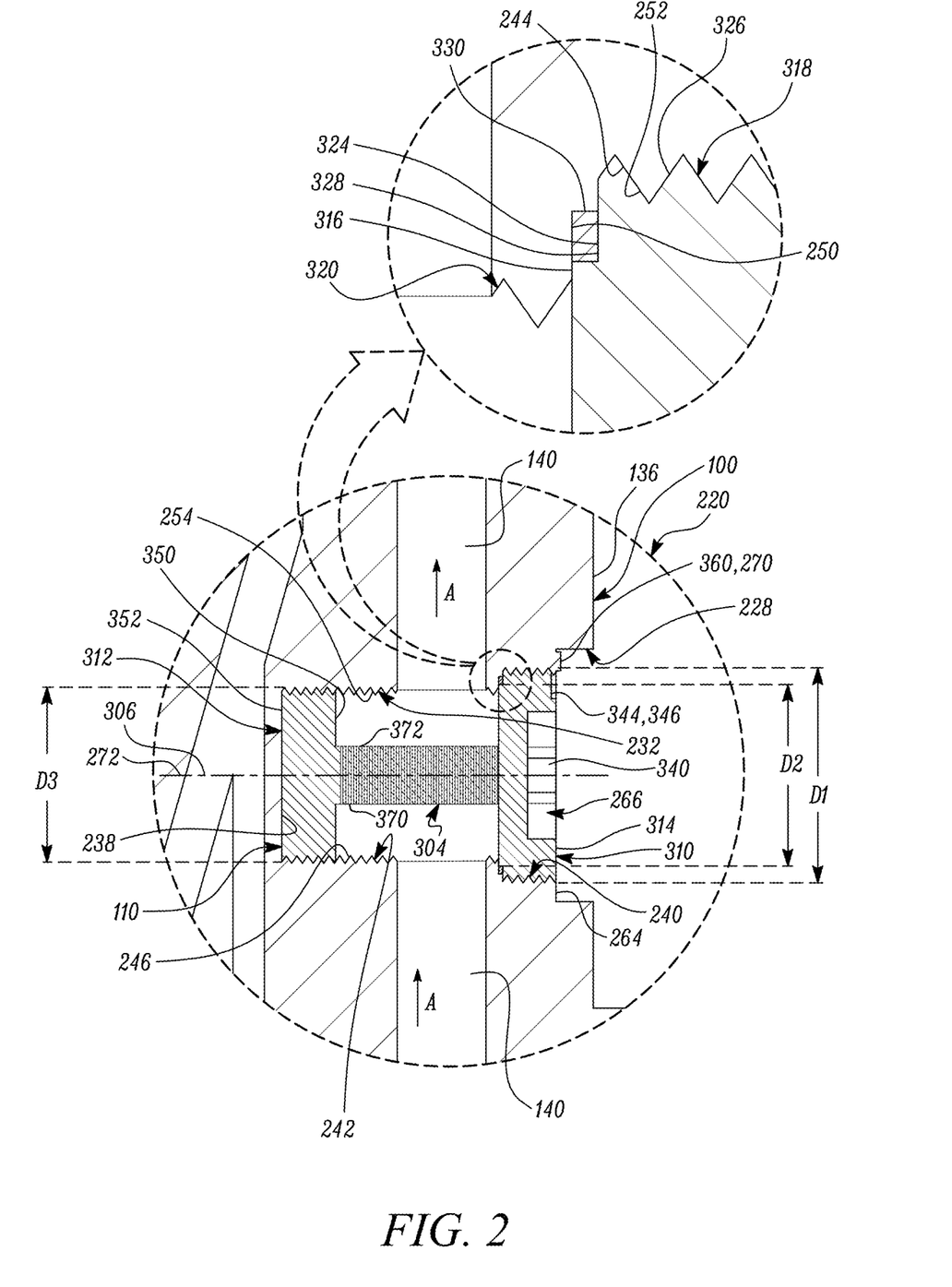
FIG. 2 is an enlarged front view of the filter of FIG. 1 disposed in a filter position, in accordance with an embodiment of the present disclosure.
Figure 3:
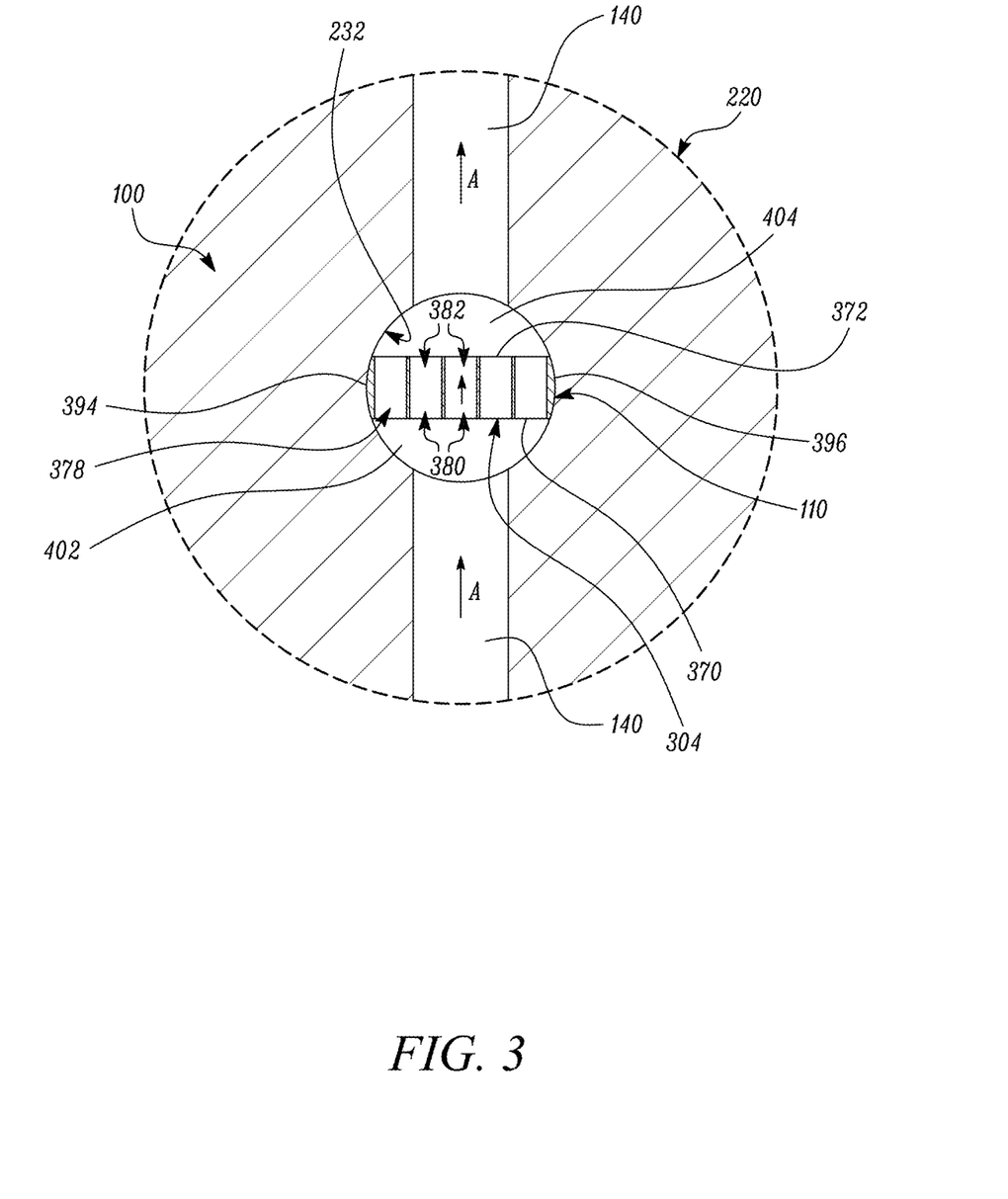
FIG. 3 is an enlarged side view of the filter of FIG. 1 disposed in a filter position, in accordance with an embodiment of the present disclosure.
Figure 4:
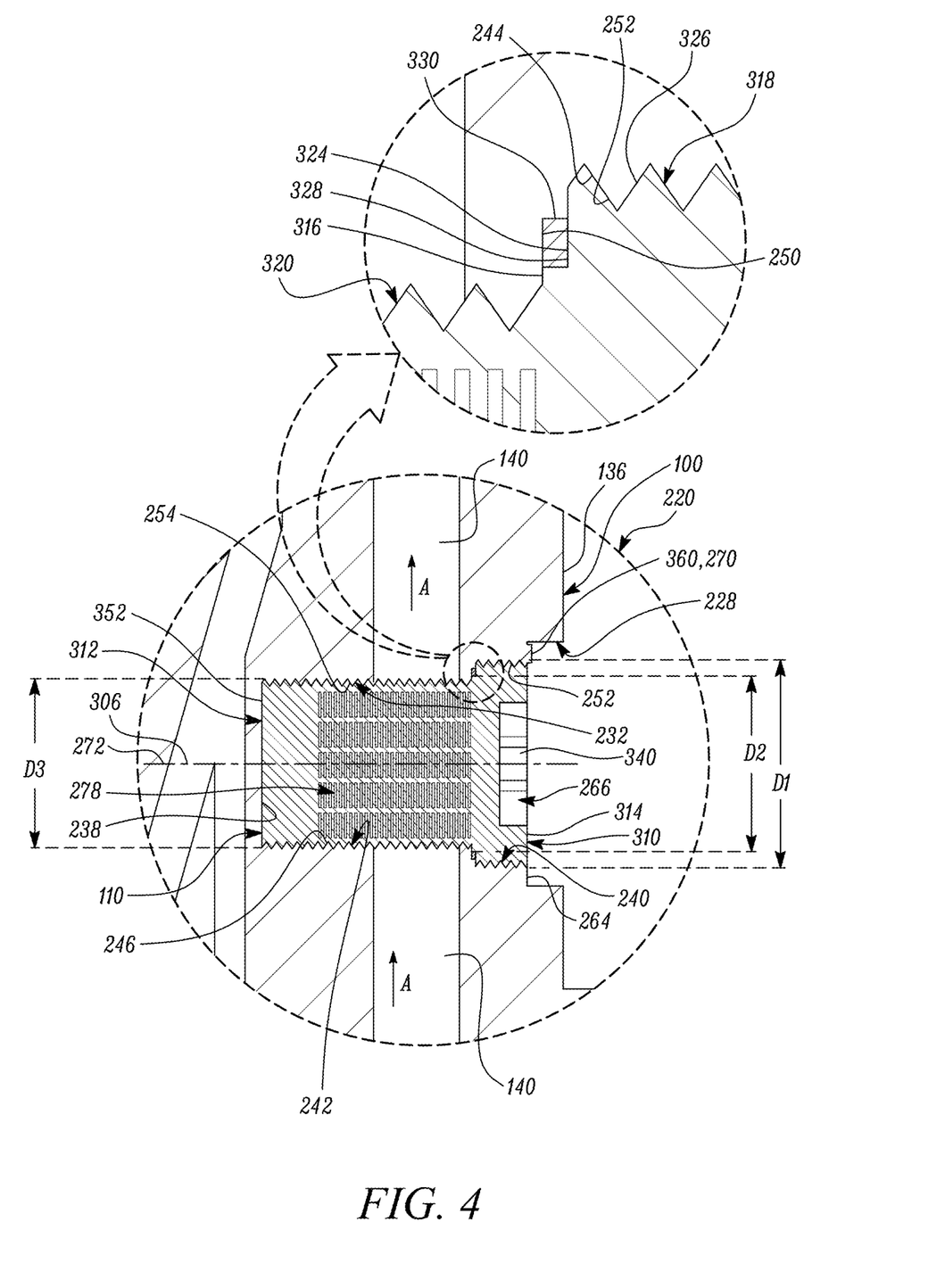
FIG. 4 is an enlarged front view of the filter of FIG. 1 disposed in a bypass position, in accordance with an embodiment of the present disclosure.
Figure 5:
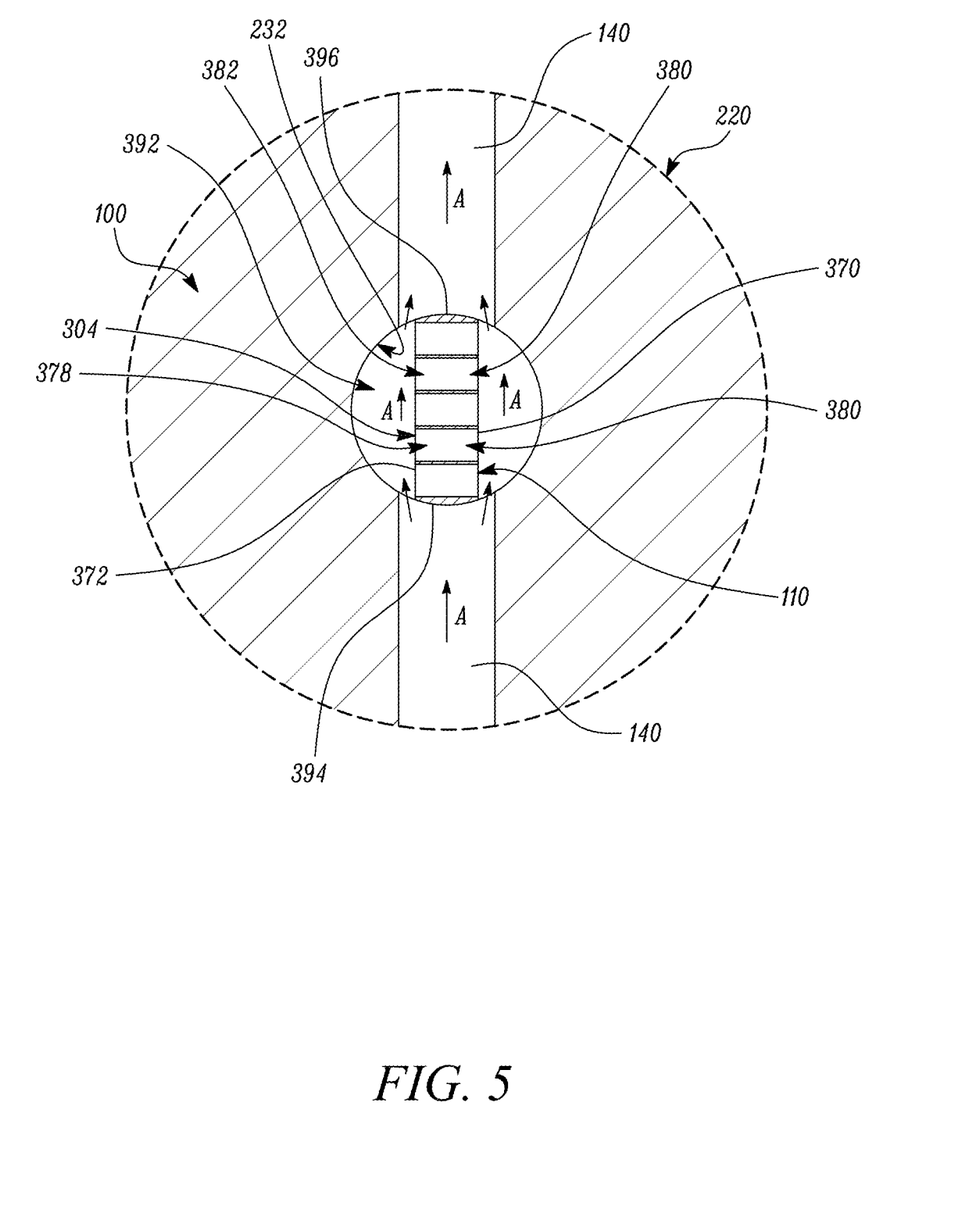
FIG. 5 is an enlarged side view of the filter of FIG. 1 disposed in a bypass position, in accordance with an embodiment of the present disclosure.

Referring to FIGS. 1, 2 and 3, forthcoming description relates to the filtration of the hydraulic fluid during a flow of the hydraulic fluid through the high-pressure passage 140 and the pressure control passage 144. To this end, the body 116 includes a first filtering section 220 that is configured to accommodate the first filter 110 to filter hydraulic fluid flowing through the high-pressure passage 140, and a second filtering section 222 that is configured to accommodate the second filter 112 to filter hydraulic fluid flowing through the pressure control passage 144.

The second filtering section 222 includes features that are similar to that of the first filtering section 220, and each of which may be disposed symmetrically to the first filtering section 220 about the longitudinal axis 134, as shown. To avoid redundancy, corresponding features of the second filtering section 222, i.e., a recess and a cavity have not been explicitly annotated or discussed as they are understood to remain similar to the recess 228 and the cavity 232 of the first filtering section 220. Further, for ease, the description below will generally include discussions directed towards the first filtering section 220 (vis-à-vis the first filter 110). Unless specified otherwise, such description will be equivalently applicable for the second filtering section 222 (vis-à-vis the second filter 112), as well. Moreover, discussions that are directed towards the first filter 110 will be applicable to the second filter 112, as well. Wherever required, explicit references to the second filtering section 222 and the second filter 112 may also be used.

The first filtering section 220 includes a recess 228 extending inwardly into the body 116 from the outer surface 136 of the body 116, and a cavity 232 spanning from the recess 228 and extending further into the body 116 generally laterally across the high-pressure passage 140, as shown, up to an end face 238 of the body 116. The cavity 232 may include a first cavity portion 240 and a second cavity portion 242. Both the first cavity portion 240 and the second cavity portion 242 may be generally cylindrical in profile and may be defined by inner walls 244, 246 of the body 116 that are in turn cylindrical in shape. Although a cylindrical profile is considered, it may be appreciated that the first cavity portion 240 may include any other profile, such as, but not limited to, a square profile, an oval profile, a rectangular profile, etc. For example, the first cavity portion 240 is defined by a first inner wall 244 and the second cavity portion 242 is defined by a second inner wall 246. The first inner wall 244 may extend from the recess 228 into the body 116 of the fuel injector 100, while the second inner wall 246 may extend from the first inner wall 244, and may extend further into the body 116 of the fuel injector 100. The first cavity portion 240 may be disposed co-axially with respect to the second cavity portion 242 such that the second inner wall 246 is defined concentrically with respect to the first inner wall 244. In some embodiments, the first cavity portion 240 may include a first diameter, while the second cavity portion 242 may include a second diameter that may be smaller than the first diameter. Since the second diameter may be smaller than the first diameter, an in-cavity step 250 may be defined between the first cavity portion 240 and the second cavity portion 242.

In some embodiments, threads 252, 254 may be formed on the first inner wall 244 and the second inner wall 246. For example, the threads 252 formed on the first inner wall 244 may be referred to as first threads 252, while the threads 254 formed on the second inner wall 246 may be referred to as second threads 254. The second threads 254 may define a pitch same as a pitch defined by the first threads 252, although it is possible in some cases for the pitch defined by the second threads 254 to differ from the pitch defined by the first threads 252.

Figure 6:
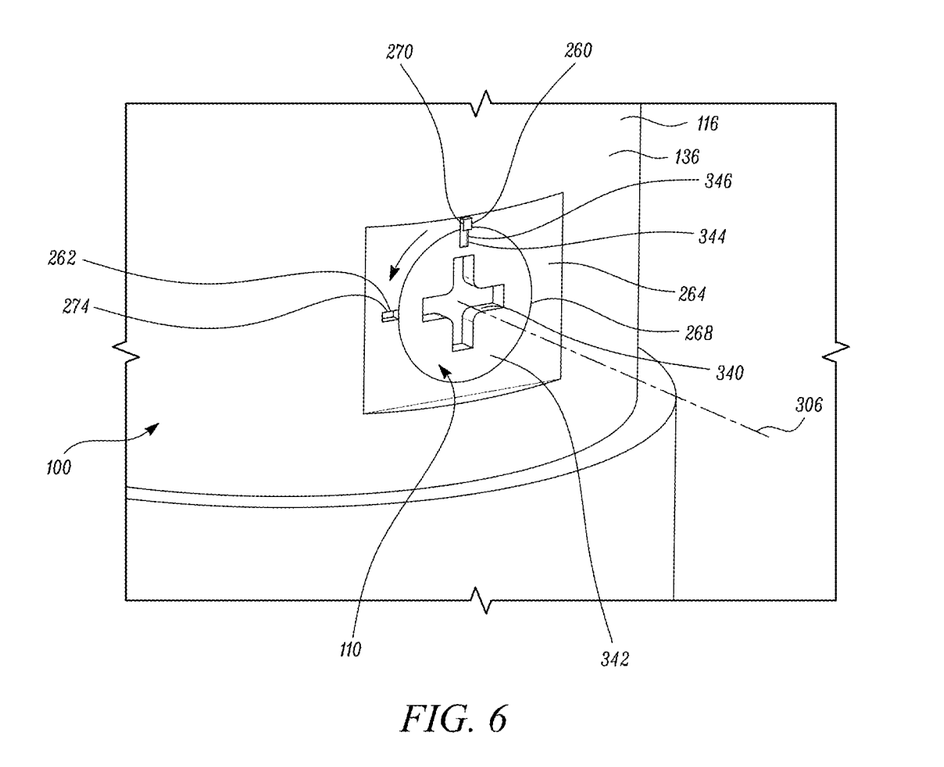
FIG. 6 is an enlarged side view the filter depicting an alignment of an indicia with a first indicator to indicate a positioning of the filter in the filter position, in accordance with an embodiment of the present disclosure.

Further, the fuel injector 100 may include a first indicator 260 (shown in FIG. 6) and a second indicator 262 (shown in FIG. 6) disposed on the body 116 to provide an indication of an orientation or a positioning of the first filter 110 within the body 116 of the fuel injector 100. The first indicator 260 and the second indicator 262 may be disposed at a recess step 264 defined between the cavity 232 and the recess 228. The first indicator 260 and the second indicator 262 may be disposed in proximity to an opening 266 of the cavity 232 defined at an interface of the cavity 232 and the recess 228. The first indicator 260 and the second indicator 262 may be disposed at an angular offset from each other around the opening 266. In some implementations, the angular offset may be ninety degrees. In some embodiments, the first indicator 260 and the second indicator 262 may extend radially outwardly from an outer periphery 268 (shown in FIG. 6) of the opening 266 on the recess step 264. As shown, the first indicator 260 may be a protrusion 270 extending axially outwardly along an axis 272 of the cavity 232 from the recess step 264. The first indicator 260 may also extend radially outwardly on the recess step 264 from the outer periphery 268 of the opening 266. Further, in some implementations, the second indicator 262 may be a groove 274 extending axially inwardly along the axis 272 of the cavity 232 from the recess step 264. The second indicator 262 may also extend radially outwardly into the recess step 264 from the outer periphery 268 of the opening 266. Although the first indicator 260 and the second indicator 262 are contemplated as the protrusion 270 and the groove 274 respectively, it may be appreciated that both the first indicator 260 and the second indicator 262 may be either protrusions or grooves. Further, the first indicator 260 and the second indicator 262 may be markings, such as paint markings, formed on the recess step 264.

Referring to FIGS. 2, 3, 4, 5, 6, 7 and 8, the first filter 110 will now be discussed. For simplicity, the first filter 110 may be interchangeably referred to as "filter 110", while the first filtering section 220 may be interchangeably referred to as "filtering section 220", hereinafter.

The filter 110 includes a first end structure 300, a second end structure 302, and an intermediate structure 304 extending from the first end structure 300 to the second end structure 302. Further, the filter 110 defines a longitudinal axis 306 extending along a length of the filter 110. In the illustrated embodiment, the first end structure 300 is a disc shaped structure (hereinafter referred to as a first disc structure 310) and the second end structure 302 is also a disc shaped structure (hereinafter referred to as a second disc structure 312). Although, both the first end structure 300 and the second end structure 302 are contemplated as disc shaped structures, it may be appreciated that the first end structure 300 and the second end structure 302 may include any other shapes and configurations, such as, but not limited to, square shaped structures, oval shaped structures, polygonal shaped structures, etc., that facilitate a functioning and assembly of the filter 110 with the fuel injector 100, as described hereinafter.

The first disc structure 310 may include a first axial end 314, a second axial end 316, a first disc portion 318, a second disc portion 320 (best shown in FIGS. 2 and 4), an outer circumferential surface 322, a seat 324 (shown in FIGS. 2 and 4), and threads 326 (hereinafter referred as third threads 326). The first disc portion 318 extends from the first axial end 314 to the second disc portion 320, and has a first diameter D1, while the second disc portion 320 extends from the first disc portion 318 to the second axial end 316 and has a second diameter D2. As illustrated, the second disc portion 320 extends from the first disc portion 318 to the intermediate structure 304. The diameter of the second disc portion 320 (i.e., the second diameter D2) is smaller than the diameter of the first disc portion 318 (i.e., the first diameter D1), and therefore the second disc portion 320 defines the seat 324 (i.e., a step 328) with the first disc portion 318. The seat 324 is configured to receive a seal 330 in an assembly of the filter 110 with the body 116 of the fuel injector 100. In an assembly of the filter 110 with the body 116 of the fuel injector 100, the seal 330 rests on the seat 324 and is disposed or sandwiched between the in-cavity step 250 (defined by the body 116) and the seat 324. The seal 330 is configured to prevent a leakage of hydraulic fluid from the cavity 232 of the fuel injector 100.

Further, the third threads 326 are formed on the outer circumferential surface 322, and facilitate a threadable engagement of the first disc structure 310 with the body 116 of the fuel injector 100. In an assembly of the filter 110 with the fuel injector 100, the first disc structure 310 is received, at least partly, inside the cavity 232 such that the third threads 326 are engaged with the first threads 252. It may be appreciated that the first axial end 314 may be flush with the recess step 264 when the filter 110 is assembled with the body 116 of the fuel injector 100 and the filter 110 is disposed inside the cavity 232.

In certain implementations, the first disc structure 310 may include a keyway 340 to facilitate a coupling of the filter 110 with body 116. The keyway 340 may be configured to receive a tool (not shown), such as a key, to facilitate a rotation of the filter 110 relative to the body 116 of the fuel injector 100. Such a rotation of the filter 110 may facilitate an insertion, an engagement or a disengagement of the filter 110 with the body 116 by facilitating an engagement or a disengagement of the third threads 326 with the first threads 252. In an embodiment, the keyway 340 may be disposed at the first axial end 314 and may extend into the first disc structure 310 from a first axial surface 342 of the first disc structure 310. For example, the keyway 340 may be a groove extending axially along the longitudinal axis 306 from the first axial surface 342 into the first disc structure 310.

In certain implementations, the first disc structure 310 may also include an indicia 344 to indicate a position or orientation of the filter 110 inside the cavity 232 of the fuel injector 100. In an embodiment, the indicia 344 may be a slot 346 disposed at the first axial end 314 of the filter 110, and may radially extend relative to the longitudinal axis 306 from the outer circumferential surface 322 towards a center of the first disc structure 310. In some implementations, the indicia 344 may be a protrusion extending axially along the longitudinal axis 306 and away from the first axial surface 342, and may also extend radially from the outer circumferential surface 322 towards a center of the first disc structure 310. To facilitate an indication of the positioning or an orientation of the filter 110 within the body 116 or the cavity 232 of the fuel injector 100, the indicia 344 may align with the first indicator 260 or the second indicator 262. An alignment of the indicia 344 with the first indicator 260 may indicate that the filter 110 is disposed at a filter position within the body 116 or the cavity 232, while an alignment of the indicia 344 with the second indicator 262 may indicate that the filter 110 is disposed at a bypass position within the body 116 or the cavity 232.

The second disc structure 312 includes a first axial end surface 350, a second axial end surface 352 opposite to the first axial end surface 350, an outer circumferential surface 354 extending between the first axial end surface 350 and the second axial end surface 352, and threads 356 (hereinafter referred as fourth threads 356) formed on the outer circumferential surface 354. In an embodiment, the second disc structure 312 includes a diameter D3 that is substantially equal to the diameter D2 of the second disc portion 320 of the first disc structure 310. The fourth threads 356 are configured to engage with the second threads 254, thereby facilitating a threadable engagement of the second disc structure 312 with the body 116 of the fuel injector 100. In an assembly of the filter 110 with the body 116, the second disc structure 312 is received and is disposed inside the cavity 232 such that the fourth threads 356 are engaged with the second threads 254 formed on the second inner wall 246 defining the second cavity portion 242.

Figure 7:
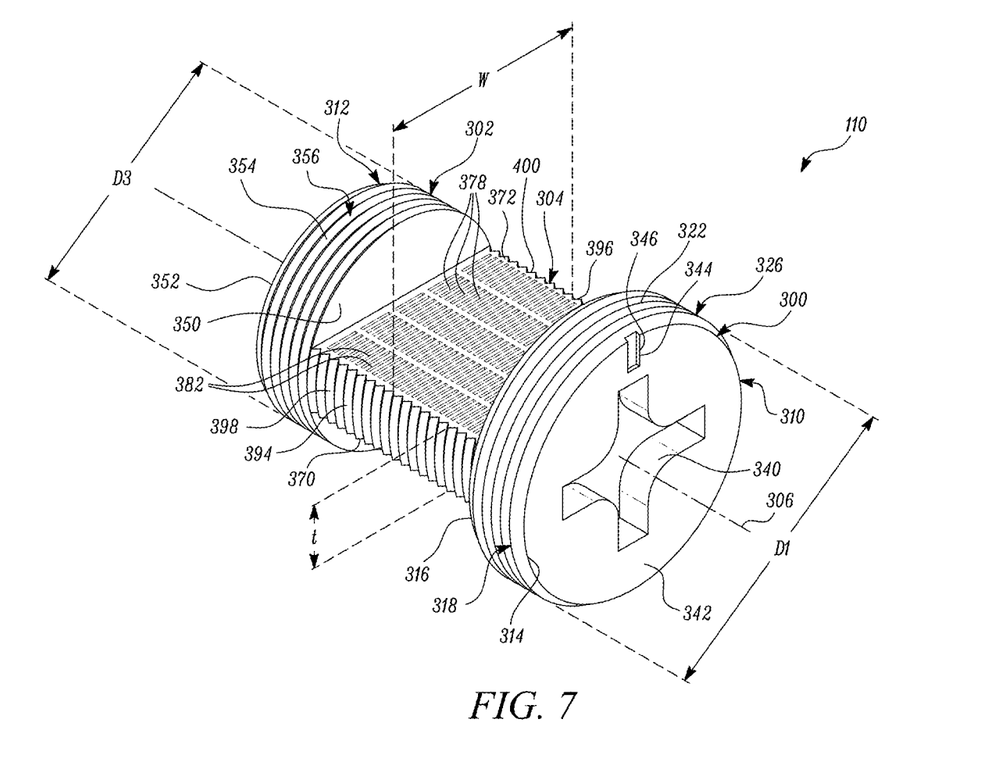
FIG. 7 is a perspective view of the filter of FIG. 1, in accordance with an embodiment of the present disclosure.
Figure 8:
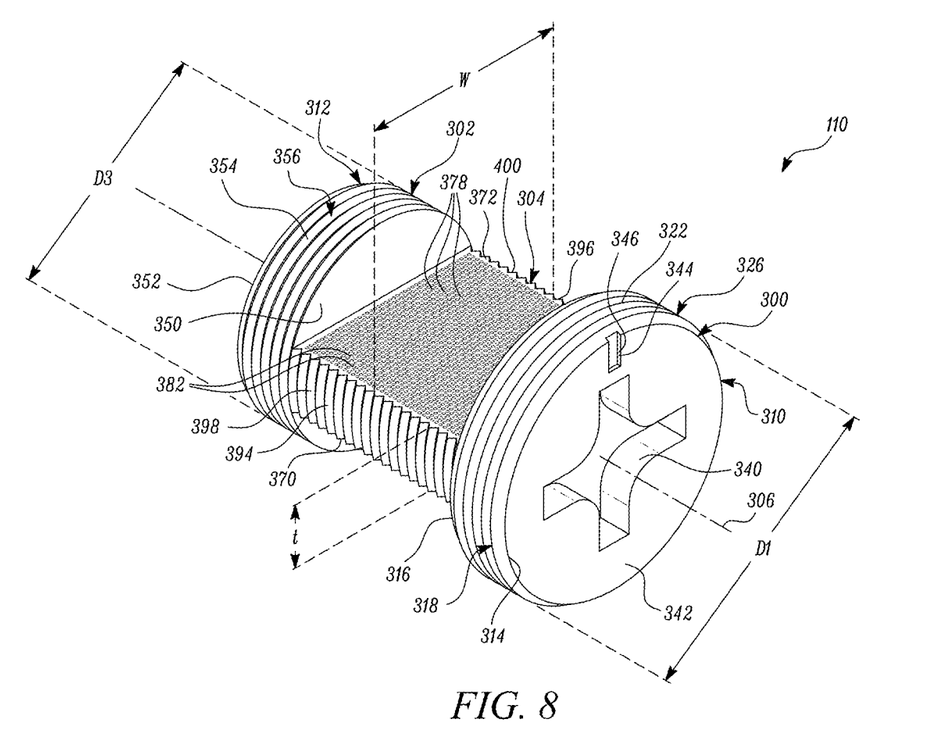
FIG. 8 is a perspective view of a filter, in accordance with an alternative embodiment of the present disclosure.

The intermediate structure 304 extends from the first disc structure 310 to the second disc structure 312, and includes a first surface 370 and a second surface 372 disposed opposite and parallel to the first surface 370. As shown, the intermediate structure 304 is connected with the second disc portion 320 and the first axial end surface 350 and extends from the second disc portion 320 to the first axial end surface 350. The intermediate structure 304 includes a thickness 't' smaller than the diameter D3 of the second disc structure 312 and a width 'w' equal to the diameter D3 of the second disc structure 312. Further, the intermediate structure 304 defines a plurality of passages 378 extending from the first surface 370 to the second surface 372. Each of the plurality of passages 378 is perpendicular to the longitudinal axis 306 of the filter 110. Each passage 378 includes one or more of a circular cross-section (as shown in FIG. 8) and a rectangular cross-section (as shown in FIG. 7). Other crosssectional profiles may be contemplated. Each passage 378 defines an inlet opening 380 (best shown in FIG. 3) at the first surface 370 and an outlet opening 382 (best shown in FIG. 3, and 7) at the second surface 372. The inlet opening 380 facilitates an entry of the hydraulic fluid into the filter 110 from the channel 140, while the outlet opening 382 facilitates an exit of the hydraulic fluid from the filter 110 into the channel 140. When the filter 110 is assembled within the cavity 232 and positioned or oriented in the filter position (as shown in FIG. 2), the first surface 370 and the second surface 372 of the intermediate structure 304 are disposed perpendicular to the channel 140, and, in such a case, the passages 378 and the channel 140 are disposed parallel to each other, while, in the bypass position, the first surface 370 and the second surface 372 are disposed perpendicular to the channel 140. Further, in the bypass position, each passage 378 and the channel 140 are disposed substantially perpendicular to each other. In this manner, in the filter position, the filter 110 facilitates a filtering of the hydraulic fluid as the hydraulic fluid enters and passes through the passages 378, while, in the bypass position, the hydraulic fluid bypasses the passages 378 and flows through spaces 390, 392 (shown in FIG. 5). The space 390 (hereinafter referred as first space 390) is defined between the first surface 370 and the second inner wall 246, while the space 392 (hereinafter referred as second space 392) is defined between the second surface 372 and the second inner wall 246. Both the first space 390 and the second space 392 are defined in the bypass position as the thickness 't' of the intermediate structure 304 is smaller than the diameter of the second cavity portion 242. Further, in the filter position, both the first space 390 and the second space 392 are non-existent as the width 'w' of the intermediate structure 304 is equal to the diameter of the second cavity portion 242.

In some embodiments, the intermediate structure 304 defines two arcuate surfaces 394, 396 (best shown in FIG. 3 and FIG. 5), defined according to a curvature defined by the second disc structure 312 or the second cavity portion 242 of the cavity 232. For example, the two arcuate surfaces 394, 396 include a first arcuate surface 394 and a second arcuate surface 396 disposed opposite to the first arcuate surface 394 and connecting the first surface 370 with the second surface 372. The first arcuate surface 394 and the second arcuate surface 396, respectively, include fifth threads 398 and sixth threads 400. The fifth threads 398 and the sixth threads 400 are configured to engage with the second threads 254 formed on the second inner wall 246 of the body 116. A profile of the fifth threads 398 and the sixth threads 400 may be continuous with a profile of the second threads 254.

Further, in an assembled state of the filter 110 with the body 116 and within the cavity 232, the third threads 326 are in threadable engagement with the first threads 252 formed on the first inner wall 244 while the fourth threads 356, the fifth threads 398, and the sixth threads 400, are in threadable engagement with the second threads 254 formed on the second inner wall 246 of the body 116. Further, in such a case, the second axial end surface 352 of the second disc structure 312 abuts the end face 238. Also, in the assembled state, the first axial surface 342 of the first disc structure 310 may be aligned and flush with the recess step 264. Further, in the assembled state, the intermediate structure 304 is disposed, at least partly, within the channel 140.

INDUSTRIAL APPLICABILITY

During an assembly of the filter 110 into the filtering section 220, an operator may first insert the filter 110 into the recess 228, with the first disc structure 310 entering the recess 228 first. As the operator may push the filter 110 further into the filtering section 220, the second disc structure 312 may move into the cavity 232. A continued push to the filter 110 causes the second disc structure 312 to move across a length of the first cavity portion 240, and eventually, the second disc structure 312 comes into contact with the second cavity portion 242. Thereafter, the operator may start rotating the filter 110 to threadably engage the fourth threads 356 with the second threads 254 formed on second inner wall 246. A continued rotation of the filter 110 causes a linear movement of the second disc structure 312 inside the second cavity portion 242. The operator continues to rotate the filter 110 to cause an engagement of the fifth threads 398 and the sixth threads 400 of the intermediate structure 304 with the second threads 254. Additional rotation of the filter 110 may cause an insertion of a portion of the intermediate structure 304 within the second cavity portion 242, and, eventually, the first disc structure 310 comes into contact with the first cavity portion 240. Before the first disc structure 310 comes into contact with the first cavity portion 240, the operator may position the seal 330 on the seat 324. A further rotation of the filter 110 causes an engagement of the third threads 326 with the first threads 252 formed on the first inner wall 244, and a linear movement of the first disc structure 310 inside the first cavity portion 240. Eventually, the second axial end surface 352 contacts the end face 238, and, in such a case, the intermediate structure 304 is disposed in the second cavity portion 242, and the first axial surface 342 and the recess step 264 are flush with each other. Further, at this stage, the seal 330 comes into contact with the in-cavity step 250, and gets sandwiched between the seat 324 and the in-cavity step 250. At this stage, no further rotation of the filter 110, along a direction of insertion into the cavity 232, is possible. Further, at this stage, the filter 110 is positioned or oriented within the cavity 232 at the filter position, which is indicated by the alignment of the indicia 344 with the first indicator 260.

During operation, as hydraulic fluid may pass from the fluid source 154 into the high-pressure passage 140 via the fluid line 156, and move along direction A, the first filter 110, when disposed in the filter position, receives the hydraulic fluid and filters the hydraulic fluid before allowing further passage of the hydraulic fluid towards the cavity section 150. During filtration, the hydraulic fluid first enters into a chamber 402 defined upstream of the first filter 110 from the channel 140. Thereafter, the hydraulic fluid enters into the passages 378 through the inlet openings 380, and exits the passages 378 through the outlet openings 382. As the hydraulic fluid enters through the inlet openings 380, constituents or particles having a size or dimension larger than the size or dimension of the inlet openings 380 may be restricted or prevented to flow through the passages 378 along direction A, and, accordingly, the hydraulic fluid is filtered. Once the hydraulic fluid is filtered, a filtered volume of hydraulic fluid exits the passages 378 through the outlet openings 382, and moves into a chamber 404 defined downstream of the first filter 110 before moving into the channel 140 and further travel along direction A. In that manner, hydraulic fluid flowing within the high-pressure passage 140 is filtered. A similar filtering sequence and operation may be contemplated for the second filter 112, positioned within the second filtering section 222, as well.

It may be noted that the flow direction (i.e., direction A) as aforementioned may change in certain circumstances, and thus the direction A, as illustrated, is exemplary. Accordingly, it will be appreciated that the filter 110 is also capable of filtering hydraulic fluid travelling in reverse direction (i.e., in a direction opposite to direction A), as well.

Further, in a scenario, at the start of an engine in which the fuel injector 100 is installed, the operator may reposition or reorient the filter 110 from the filter position to the bypass position. The operator may insert the tool into the keyway 340 and rotate the filter 110 to align the indicia 344 with the second indicator 262. The operator may position the filter 110 in the bypass position as a viscosity of the hydraulic fluid at engine start may be relatively high, and the hydraulic fluid with relatively higher viscosity may take longer to pass through the filter 110 and actuate the fuel injector 100. In the bypass position, the hydraulic fluid bypasses the passages 378 of the intermediate structure 304, and flows through the first space 390 and the second space 392. Further, the operator may position or orient the filter 110 back to the filter position after a predetermined time has elapsed since engine start by inserting the tool into the keyway 340 and rotating the filter 110 and aligning the indicia 344 with the second indicator 262.

If the filter 110 is required to be cleaned/rinsed after a period of use, the filter 110 may be removed from the filtering section 220 by inserting the tool into the keyway 340 and unscrewing the filter 110 from the body 116 of the fuel injector 100. Once the cleaning/rinsing procedure of the filter 110 is complete, the filter 110 may be secured back into the filtering section 220 according to the process described above. Optionally, the filter 110 may also be used at a first start of an (associated) engine after a service operation on the engine has ended, to filter out leftover debris present in the hydraulic fluid flow. Once the hydraulic fluid flow is cleared up from debris, the filter 110 may be removed. It may be understood from the aforementioned description that the filter 110 provides for a more modular and convenient means to filter the hydraulic fluid, while also helping prolong a life of the fuel injector 100.

It will be apparent to those skilled in the art that various modifications and variations can be made to the system of the present disclosure without departing from the scope of the disclosure. Other embodiments will be apparent to those skilled in the art from consideration of the specification and practice of the system disclosed herein. It is intended that the specification and examples be considered as exemplary only, with a true scope of the disclosure being indicated by the following claims and their equivalent.

What is claimed is:

1. A filter for filtering hydraulic fluid in a hydraulically actuated fuel injector, the filter comprising:
   a first disc structure;
   a second disc structure disposed axially spaced apart from the first disc structure, and parallel to the first disc structure; and
   an intermediate structure extending from the first disc structure to the second disc structure, the intermediate structure including a first surface and a second surface disposed opposite and parallel to the first surface, the intermediate structure defining a plurality of passages extending from the first surface to the second surface;
   wherein each of the plurality of passages is perpendicular to a longitudinal axis of the filter.

2. The filter of claim 1, wherein the first disc structure includes threads adapted to facilitate a threadable coupling of the filter with a body of the hydraulically actuated fuel injector.

3. The filter of claim 1, wherein the second disc structure includes threads adapted to facilitate a threadable coupling of the filter with a body of the hydraulically actuated fuel injector.

4. The filter of claim 1, wherein the first disc structure includes a first disc portion and a second disc portion extending from the first disc portion to the intermediate structure, the second disc portion has a diameter smaller than a diameter of the first disc portion to define a seat with the first disc portion to receive a seal.

5. The filter of claim 4, wherein the second disc structure includes a diameter equal to the diameter of the second disc portion of the first disc structure.

6. The filter of claim 1, wherein the intermediate structure includes a thickness smaller than a diameter of the second disc structure and a width equal to the diameter of the second disc structure.

7. The filter of claim 1, wherein the first disc structure includes an indicia to indicate a position of the filter inside the hydraulically actuated fuel injector.

8. The filter of claim 1, wherein the first disc structure includes a keyway to facilitate a coupling of the filter with the hydraulically actuated fuel injector.

9. The filter of claim 1, wherein each passage includes a circular cross-section.

10. The filter of claim 1, wherein each passage includes a rectangular cross-section.

11. A hydraulically actuated fuel injector, comprising:
    a body with a channel to receive hydraulic fluid; and
    a filter for filtering the hydraulic fluid flowing through the channel, the filter including:
       a first disc structure engaged with the body;
       a second disc structure disposed axially spaced apart from the first disc structure and engaged with the body, the second disc structure being parallel to the first disc structure; and
       an intermediate structure extending from the first disc structure to the second disc structure and disposed, at least partly, within the channel, the intermediate structure including a first surface and a second surface disposed opposite and parallel to the first surface, the intermediate structure defining a plurality of passages extending from the first surface to the second surface;
       wherein each of the plurality of passages is perpendicular to a longitudinal axis of the filter.

12. The hydraulically actuated fuel injector of claim 11, wherein the filter is configured to be moved to a filter position and a bypass position;
    wherein in the filter position, each of the plurality of passages is disposed parallel to the channel, facilitating a filtration of the hydraulic fluid through the intermediate structure; and
    wherein in the bypass position, each passage of the plurality of passages is perpendicularly disposed relative to the channel, facilitating a bypassing of the hydraulic fluid across the intermediate structure.

13. The hydraulically actuated fuel injector of claim 11, wherein the first disc structure is threadably engaged with the body of the hydraulically actuated fuel injector.

14. The hydraulically actuated fuel injector of claim 11, wherein the second disc structure is threadably engaged with the body of the hydraulically actuated fuel injector.

15. The hydraulically actuated fuel injector of claim 11, wherein the first disc structure includes a first disc portion and a second disc portion extending from the first disc portion to the intermediate structure and having a diameter smaller than a diameter of the first disc portion to define a seat with the first disc portion to receive a seal.

16. The hydraulically actuated fuel injector of claim 15, wherein the second disc structure includes a diameter equal to the diameter of the second disc portion of the first disc structure.

17. The hydraulically actuated fuel injector of claim 11, wherein the intermediate structure includes a thickness smaller than a diameter of the second disc structure and a width equal to the diameter of the second disc structure.

18. The hydraulically actuated fuel injector of claim 11, wherein the first disc structure includes an indicia to indicate a position of the filter.

19. The hydraulically actuated fuel injector of claim 11, wherein the first disc structure includes a keyway to facilitate a rotation of the filter within the body of the hydraulically actuated fuel injector.

20. The hydraulically actuated fuel injector of claim 11 further including a seal disposed between the body and the first disc structure.

* * * * *